(12) United States Patent
Agrawal et al.

(10) Patent No.: US 8,935,233 B2
(45) Date of Patent: Jan. 13, 2015

(54) APPROXIMATE INDEX IN RELATIONAL DATABASES

(75) Inventors: Vatsalya Agrawal, Indore (IN); Vivek Bhaskar, Bihar (IN); Ahmed Shareef, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/892,373

(22) Filed: Sep. 28, 2010

(65) Prior Publication Data
US 2012/0078904 A1 Mar. 29, 2012

(51) Int. Cl.
G06F 7/00 (2006.01)
G06F 17/00 (2006.01)
G06F 17/30 (2006.01)

(52) U.S. Cl.
CPC ................... G06F 17/30321 (2013.01)
USPC ............. 707/715; 707/718; 707/719

(58) Field of Classification Search
CPC ............ G06F 17/30286; G06F 17/30321
USPC ..................................... 703/2; 707/715
See application file for complete search history.

(56) References Cited

U.S. PATENT DOCUMENTS

| | | | |
|---|---|---|---|
| 5,043,872 A * | 8/1991 | Cheng et al. | 1/1 |
| 5,729,732 A | 3/1998 | Gal et al. | |
| 5,758,146 A * | 5/1998 | Schiefer et al. | 707/715 |
| 5,778,353 A * | 7/1998 | Schiefer et al. | 1/1 |
| 5,978,792 A | 11/1999 | Bhargava et al. | |
| 6,505,205 B1 * | 1/2003 | Kothuri et al. | 1/1 |
| 6,658,405 B1 | 12/2003 | Ozbutun | |
| 6,732,085 B1 | 5/2004 | Mozes | |
| 7,103,588 B2 | 9/2006 | Beck et al. | |
| 2005/0010564 A1 | 1/2005 | Metzger et al. | |
| 2006/0161403 A1 * | 7/2006 | Jiang et al. | 703/2 |
| 2007/0282888 A1 | 12/2007 | Vazquez et al. | |
| 2009/0063396 A1 | 3/2009 | Gangarapu et al. | |
| 2009/0182724 A1 * | 7/2009 | Day et al. | 707/5 |
| 2009/0287637 A1 * | 11/2009 | Day et al. | 707/2 |
| 2010/0114843 A1 | 5/2010 | Farrar et al. | |

OTHER PUBLICATIONS

Datta, Anindya; Ramamritham, Krithi, Thomas, Helen. "Curio: A Novel Solution for Efficient Storage and Indexing in Data Warehouses", Proceedings of the 25th VLDB Conference, Edinburgh, Scotland, 1999.

Sharman, Michael. Returning random results with MySQL. <http://www.chapter31.com/2008/03/21/returning-random-results-with-mysql/>. Mar. 21, 2008.

Comer, Douglas: "The Ubiquitous B-Tree", Computing Surveys, vol. II, No. 2, Jun. 1979.

(Continued)

*Primary Examiner* — Susan Chen
(74) *Attorney, Agent, or Firm* — Mollborn Patents, Inc.; Fredrik Mollborn

(57) ABSTRACT

A database table is provided. The database table includes several column tuples. A column is selected in the database table. The column tuples of the selected column are partitioned into several bins. Each bin includes a range of tuples and associated metadata. The associated metadata includes at least one of: a minimum tuple value for the tuples in the bin, a maximum tuple value for the tuples in the bin, a minimum tuple identifier for the bin and a maximum tuple identifier for the bin. The bins are sorted based on the tuple values to provide an approximate index for the database.

17 Claims, 8 Drawing Sheets

(56) References Cited

OTHER PUBLICATIONS

IBM Corporation: "DB2 Version 9 for Linux UNIX, and Windows; Relational Index Planning Tips" <http://publib.boulder.ibm.com/infocenter/db2luw/v9/index.jsp?topic=/com.ibm.db2.udb.admin.doc/doc/c0005054.htm>. Oct. 27, 2006.

Poosala, Viswanath; Ionnidis, Yannis E.; Haas, Peter J.; Shekita, Eugene J: "Improved Histograms for Selectivity Estimation of Range Predicates". Sigmod '96 Jun. 1996 Montreal, Canada. 1996.

Vertica Systems: "Stonebraker comments on OODB market failures, data warehouse pain, and column advantages" <http://databasecolumn.vertica.com/database-architecture/stonebraker-comments-on-oodb-market-failures-data-warehouse-pain-and-column-advantages/>. Sep. 18, 2007.

\* cited by examiner

400

| Value | 51 | 52 | 53 | 54 | 55 | 56 | 57 | 58 | 59 | 60 | 61 | 62 | 63 | 64 | 65 | 66 | 67 | 68 | 69 | 70 |
|---|---|---|---|---|---|---|---|---|---|---|---|---|---|---|---|---|---|---|---|---|
| RID | 1 | 6 | 11 | 16 | 2 | 7 | 12 | 17 | 3 | 8 | 13 | 18 | 4 | 9 | 14 | 19 | 5 | 10 | 15 | 20 |

```
int createAPINDEX(int Y, Array ridArray){
    int rIndex = 0; // index on RID-array
    boolean isNewBin = true;
    int currentRID;
    List binList = new List();
    BIN newBin = null;//object holder while (rIndex < ridArray.size()){
        if (isNewBin){
            //created a new object; store old in a list
            binList.add(newBin);
            newBin = new BIN();
            isNewBin = false;

newBin.maxValue = ridArray[rIndex].Value;
            newBin.minValue = ridArray[rIndex].Value;
            newBin.maxRid = ridArray[rIndex].RID;
            newBin.minRid = ridArray[rIndex].RID;

currentRID = ridArray[rindex].RID;
        } else{
            if((currentRID + Y) < ridArray[rIndex].RID){
                isNewBin = true;
                continue;
            } else{
                newBin.maxRid = ridArray[rIndex].RID;
                if(newBin.minValue > ridArray[rIndex].Value){
                    newBin.minValue = ridArray[rIndex].Value;
                }
                if(newBin.maxValue < ridArray[rIndex].Value){
                    newBin.maxValue = ridArray[rIndex].Value;
                }
            }
        }
        rIndex++;
    }
}
```

| Value | 51 | 52 | 53 | 54 | 55 | 56 | 57 | 58 | 59 | 60 | 61 | 62 | 63 | 64 | 65 | 66 | 67 | 68 | 69 | 70 |
|---|---|---|---|---|---|---|---|---|---|---|---|---|---|---|---|---|---|---|---|---|
| RID | 1 | 6 | 11 | 16 | 2 | 7 | 12 | 17 | 3 | 8 | 13 | 18 | 4 | 9 | 14 | 19 | 5 | 10 | 15 | 20 |
| Y | 0 | 5 | 5 | 5 | 14 | 5 | 5 | 5 | 14 | 5 | 5 | 5 | 14 | 5 | 5 | 5 | 14 | 5 | 5 | 5 |

```
int findY(int X, List Ylist, Array ridArray){
    int countX = X+1; // count the number of bins
    int Y=1;
    while (countX > X){
        int rIndex = 0; // index on ridArray
        boolean newBIN = true;
        int currentRID = 0;
        countX = 0;

// Get a new value of Y
        if(Ylist.isEmpty()){
            Y++
        } else {
            Y = Ylist.getNext();
        }

// Find X for each new value of Y
        while (rIndex < ridArray.size()){
            if (newBIN){
                countX++;
                currentRID = ridArray[rindex];
                newBIN = false;
            } else{
                if((currentRID + Y) <
ridArray[rIndex]){
                    newBIN = true;
                    continue;
                }
            }
            rIndex++;
        }
    }
    return Y;
}
```

FIG. 5

| RID | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Value | 51 | 55 | 59 | 63 | 67 | 62 | 56 | 60 | 64 | 68 | 53 | 57 | 61 | 65 | 69 | 54 | 58 | 62 | 66 | 70 |

Table 1: RID Value pairs

| Value | 51 | 52 | 53 | 54 | 55 | 56 | 57 | 58 | 59 | 60 | 61 | 62 | 63 | 64 | 65 | 66 | 67 | 68 | 69 | 70 |
|---|---|---|---|---|---|---|---|---|---|---|---|---|---|---|---|---|---|---|---|---|
| RID | 1 | 6 | 11 | 16 | 2 | 7 | 12 | 17 | 3 | 8 | 13 | 18 | 4 | 9 | 14 | 19 | 5 | 10 | 15 | 20 |

Table 2: Sorted RID Value pairs

| Value | 51 | 52 | 53 | 54 | 55 | 56 | 57 | 58 | 59 | 60 | 61 | 62 | 63 | 64 | 65 | 66 | 67 | 68 | 69 | 70 |
|---|---|---|---|---|---|---|---|---|---|---|---|---|---|---|---|---|---|---|---|---|
| RID | 1 | 6 | 11 | 16 | 2 | 7 | 12 | 17 | 3 | 8 | 13 | 18 | 4 | 9 | 14 | 19 | 5 | 10 | 15 | 20 |
| Y | 0 | 5 | 5 | 5 | 14 | 5 | 5 | 5 | 14 | 5 | 5 | 5 | 14 | 5 | 5 | 5 | 14 | 5 | 5 | 5 |

Table 3: Determination of best Y value

| Bin No | 1 | 2 | 3 | 4 | 5 | 6 | 7 | 8 | 9 | 10 |
|---|---|---|---|---|---|---|---|---|---|---|
| Minimum Tuple Value | 51 | 53 | 55 | 57 | 59 | 61 | 63 | 65 | 67 | 69 |
| Maximum Tuple Value | 52 | 54 | 56 | 58 | 60 | 62 | 64 | 66 | 68 | 70 |
| Minimum RID | 1 | 11 | 2 | 12 | 3 | 13 | 4 | 14 | 5 | 15 |
| Maximum RID | 6 | 16 | 7 | 17 | 8 | 18 | 9 | 19 | 10 | 20 |

Table 4: Determined APINDEX

FIG. 7

| Source of Data | Nature of data | Size of data | Number of Queries | Average Savings against Traditional table scan |
|---|---|---|---|---|
| Daily average of Reliance at NSE, June, 2009 to June, 2010 | Real life | 250 rows | 25 | 60 % |
| Randomly Generated Data | Random data | 100 rows | 25 | 25 % |
| Data having Zipfian distribution | Zipfian distribution | 100 rows | 25 | 20 % |

Table 5: Comparison between APINDEX and conventional query methods

FIG. 8

APPROXIMATE INDEX IN RELATIONAL DATABASES

BACKGROUND

The present invention relates to databases, and more particularly to data structures used in relational database management servers (RDBMS).

Online Analytical Processing (OLAP) applications are used in many business contexts, such as business reporting for sales, marketing, management reporting, budgeting and forecasting, etc. The OLAP applications typically obtain their data from Relational Database Management Systems (RDBMS). Such RDBMS systems can contain tables with billions of tuples (i.e., objects and information about the objects), which can require many terabytes of persistent storage.

A predicate can be described in general terms as a truth-valued function, i.e., a function that, when it is invoked, returns a truth value, such as "yes", "no" or "not defined". In RDBMS, predicates are used in Structured Query Language (SQL) expressions for conditional computation, such as evaluation of filter expression, performing join, etc. Predicate expression used in SQL could be of different types i.e. comparison (equality, less than, greater than, or not equal), range (between, combination of different comparison predicates using AND/OR), IN, Like, Exists, Equivalent, or any other Boolean expression implemented in SQL either proprietary or as per defined by standards.

One example of a predicate is a range predicate. A range predicate can be used, for example, to determine if a certain variable falls within a particular range specified by the range predicate (e.g. "Is variable A in the range of 100-200?"). When a range predicate is executed on a RDBMS table (without any index on the column), a full table scan is performed, i.e., all the column values need to be examined. Full table scans, however, slow down the execution of SQL queries and also consume excess resources, such as CPU resources, disk space, buffer space, cache, etc., and are therefore not desirable. One way full table scans can be avoided is to create suitable indexes on the required columns, i.e., those columns that are used for filtering or join expressions, which may vary from query to query.

An example of such an index is a B+ index. The B+ index is a type of binary tree that represents sorted data in a way that allows for efficient insertion, retrieval and removal of records, each of which is identified by a key. In the B+ tree, all records are stored at the leaf level of the tree, and only keys are stored in interior nodes. The B+ index facilitates faster execution of SQL queries since it provides random access to all of the tuples in a given column. However, in order to provide such access, the B+ index must store all the unique tuple-values along with their identifiers. B+ (and other similar) indexes are therefore often considered costly due to their space and maintenance requirements.

An alternative to using the B+ index is to use a so-called Sparse index. The Sparse index stores only a limited set of tuple-values and a tuple-identifier for each tuple-value. As a result, the Sparse index is more storage space efficient than a conventional B+ index, but is still useful when executing range predicates. However, a Sparse index can currently be implemented only on a column having sorted data, based on the data values in the column. Thus, when executing a range predicate on an unsorted column, it is still necessary to perform a full table scan or use a bulky conventional index, such as the B+ index.

SUMMARY

According to various embodiments of the present invention, methods and apparatus, including computer program products are provided that implement and use techniques for creating an approximate index for a database. A database table is provided. The database table includes several column tuples. A column is selected in the database table. The column tuples of the selected column are partitioned into several bins. Each bin includes a range of tuples and associated metadata. The associated metadata includes at least one of: a minimum tuple value for the tuples in the bin, a maximum tuple value for the tuples in the bin, a minimum tuple identifier for the bin and a maximum tuple identifier for the bin. The bins are sorted based on the tuple values to provide an approximate index for the database.

Further embodiments can include one or more of the following features. The database can be a relational database management system. A user input can be received that defines the number of bins in the approximate index. The column can be an unsorted column.

A query predicate that includes one or more values can be received; one or more bins whose tuple values overlap with the one or more values in the received query predicate can be selected; a list of the tuple identifiers of the selected one or more bins can be created; the smallest tuple and largest tuple identifiers in the list can be identified; and a column scan for the query predicate can be performed between the identified smallest tuple identifier and the identifier largest tuple identifier.

The query predicate can be an equality predicate, a range predicate or a comparison predicate. The approximate index can be used by a query optimizer to calculate a cost estimation for the query. The bins in the approximate index can be sorted based on tuple values from the bin with the smallest tuple values to the bin with the largest tuple values.

The details of one or more embodiments of the invention are set forth in the accompanying drawings and the description below. Other features and advantages of the invention will be apparent from the description and drawings, and from the claims.

DESCRIPTION OF DRAWINGS

FIG. 4 shows pseudo-code for creating an APINDEX, in accordance with one embodiment.

FIG. 5 shows pseudo-code for finding the correct value for V, in accordance with one embodiment.

FIG. 7 shows a set of tables illustrating the different steps in generating an APINDEX, in accordance with one embodiment.

FIG. 8 shows a comparison between the performance when using conventional query methods and using the APINDEX, in accordance with one embodiment.

Like reference symbols in the various drawings indicate like elements.

DETAILED DESCRIPTION

Overview

Figure 1:
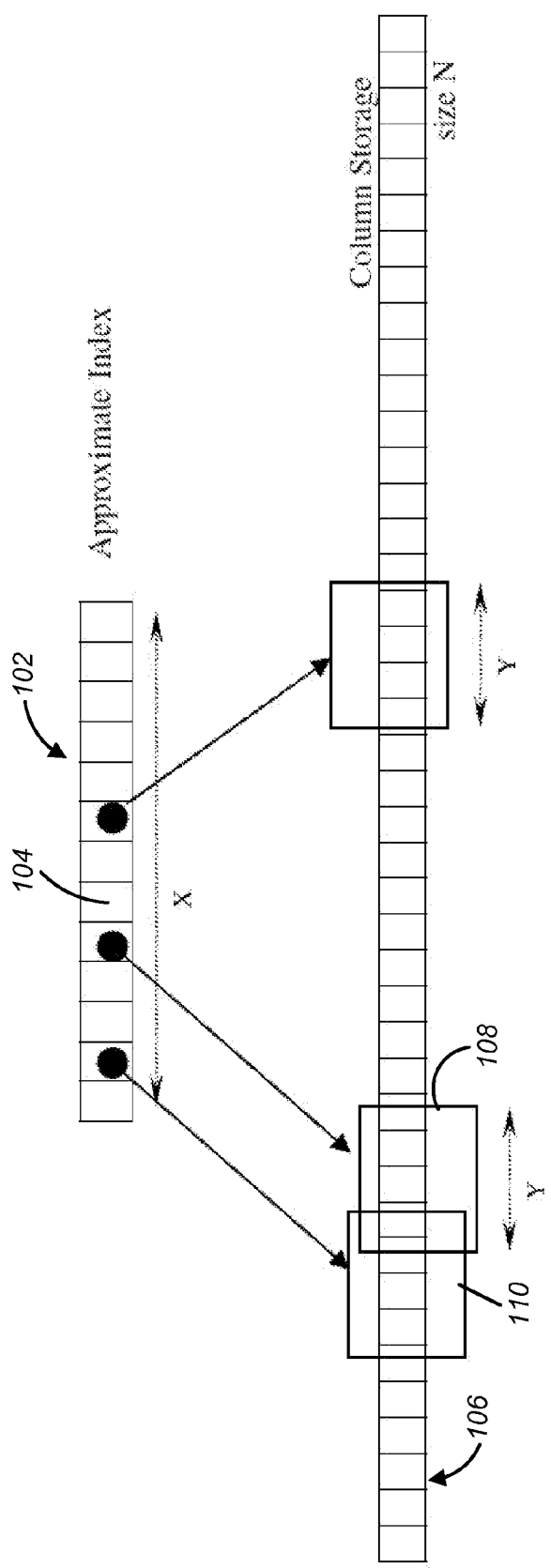
FIG. 1 shows an APINDEX structure, in accordance with one embodiment.

The various embodiments described herein describe novel methods and apparatus, including computer program products, for implementing new data structures inside a RDBMS. The data structures will be described herein by way of example and with reference to a particular data structure referred to herein as an Approximate Index (APINDEX), but as the skilled person realizes, the techniques described herein can be applied to essentially any data structure that has features similar to the APINDEX and that can be used in a RDBMS.

The APINDEX has several advantages compared to conventional database indexes. For example, the APINDEX can improve the runtime performance of SQL queries. The APINDEX can facilitate faster execution of range predicates and avoid full-table scans when B+ and sparse indexes are not present, while only using a fraction of storage space compared to the storage space required by conventional B+ index on the same column. This also has significant business implications as the growing influence of so-called "Cloud Computing," and increasing space requirements of Data Warehouses, has led query execution time and space efficiency to become one of the most important selection criteria for commercial RDBMSs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The APINDEX Data Structure

For an APINDEX data structure, according to an embodiment, tuples have values and are stored in addressable locations, such as within a column. The APINDEX data structure may relate to these values and locations as follows. As will be described in detail below, the APINDEX in accordance with one embodiment has multiple bins for representing or holding the tuples. The bins represent respective ranges of tuple values, and may be said to "contain" the tuples having values within the ranges of the respective bins. The APINDEX bins are sorted based on the tuple values. Each APINDEX bin maintains four pieces of meta-data:

1. A minimum tuple value for the bin;
2. A maximum tuple value for the bin;
3. A minimum 'unique tuple identifier', min_RID, for the bin; and
4. A maximum 'unique tuple identifier', max_RID, for the bin.

The min_RID and max_RID indicate the locations in column storage of the starting point and ending point, respectively. That is, the min_RID and max_RID define the range of the column storage in which the tuple values of the bin are located. Each of these metadata items will be described in further detail below.

The total size of the APINDEX is directly proportional to its total number of bins. The value ranges represented by each bin may vary. For example, Bin 1 may represent a value range from 10 to 20, while Bin 2 may represent a value range from 20 to 25. Similarly, the difference between min_RID and max_RID stored within each bin may not be equal. These differences may arise due to the particular method chosen for creating the APINDEX or otherwise, as will be described in further detail below.

In one embodiment, a user can provide an upper bound for the number of bins, but, of course, there are also embodiments in which the upper bound for the number of bins can be automatically defined based on parameters other than user-supplied numbers. In other embodiments, the user may choose not to provide an upper bound for the number of bins, and instead choose some kind of different criteria for APINDEX creation.

In an embodiment where a user has provided an upper bound for the number of bins, during APINDEX creation, a range of tuple identifiers (RID) is calculated for each bin, such that the total number of bins in the APINDEX remains smaller than the user provided upper bound. Expressed differently, the difference between min_RID and max_RID stored with each bin should not exceed the calculated range of tuple identifiers. Finally, the APINDEX is created using a full table scan as will be described in further detail below.

When executing a SQL query on a column, all consecutive bins having a tuple-value range that overlaps the value range provided by the range predicate, are selected. As was described above, each bin has two tuple-identifiers (i.e., min_RID and max_RID). The smallest min_RID and largest max_RID are selected from a combined list of all the tuple-identifiers of the selected bins. This defines a range of column storage to be scanned. Next, a table scan is performed between the selected smallest and largest tuple-identifiers, thus eliminating the need for a full table scan.

Using the APINDEX in accordance with the embodiments described herein does not only avoid full table scans for range predicates, but it may also be useful for resolution of other predicates, such as equality and other comparison predicates, IN, Like, etc. The equality predicate, as well as other predicates, can be evaluated in a corresponding manner to range predicates, that is, first selecting a consecutive set of bins and then performing a partial table scan among the smallest min_RID and the largest max_RID of the selected bins.

Conventional Query Optimizers, which receive queries and generate a plan for how to best execute the query, often use a "pessimistic strategy" in that they assume that a full table scan is necessary for range predicates. Using APINDEX Optimizer, on the other hand, allows a better cost estimation and thus enables accurate query planning as the Optimizer receives information about what subset of the table needs to be scanned, rather than assuming that a full table scan is necessary.

The APINDEX provides a number of advantages over existing solutions. One advantage is that the APINDEX uses much less storage space than a B+ (and other conventional) index and thus can be widely used. In contrast, the B+ index has a selective usage pattern for its space and maintenance requirements. Another advantage is that while a Sparse Index can be created only on sorted columns, the APINDEX has no such constraints and can be used equally well on unsorted columns. Yet another advantage is that a conventional optimizer with a pessimistic strategy may end up selecting a full table scan over a B+ (or other) index due to its inability to calculate an actual cost of the B+ index scan. APINDEX, on the other hand, can help in such scenarios by providing an accurate cost and facilitate a partial table scan.

Various embodiments will now be described in further detail with reference to the drawings. FIG. 1 shows an APINDEX structure (102) in accordance with one embodiment. The APINDEX has a total number, X, of bins (104), in this particular case 13 bins. Each bin (104) represents a range of tuple values, which is subset of values from the column (106). As was discussed above, each bin (104) has associated meta-data that includes a minimum tuple-value and a maximum tuple-value. The minimum and maximum tuple values define the range of tuple values contained in the bin (104). The bins (104) in the APINDEX structure (102) are ordered based on the tuple values. Thus, the minimum tuple-value of a bin (104) will be either equal to or greater than the maximum tuple-value of its preceding bin (104) in the APINDEX (102).

It is thus possible that a given tuple-value can be found in two adjacent bins. The minimum and maximum tuple-value of each bin must exist in the column (106), but every possible value between the minimum and maximum tuple-values may not exist in the column (106). Any tuple value in the range between the minimum tuple-value of a bin (104) and the maximum tuple-value of its preceding bin will by definition not be present in the column (106).

In addition to the maximum and minimum tuple values for each bin, each bin also stores two tuple-identifiers, the min_RID and the max_RID. The min_RID and the max_RID identify the locations in the column storage (106) for the contents of a bin (104). Thus, the min_RID stored with a bin may be, but is not necessarily, the tuple-identifier of the location where the minimum tuple-value is stored in the column (106). The same holds for the max_RID tuple identifier.

Furthermore, the tuple-identifier range (min_RID to max_RID) of a given bin (104) may overlap with the tuple-identifier range of any other bin, as shown by the rectangles 108 and 110 in FIG. 1, because the column storage (106) does not to be sorted. For example, bin 110 may contain values ranging from 101-200 and be located in RIDs 400-800, while bin 108 contains values ranging from 301-400 and these values can be found in RIDs 650-950.

Resolving a Range Predicate Using the APINDEX

Figure 2:
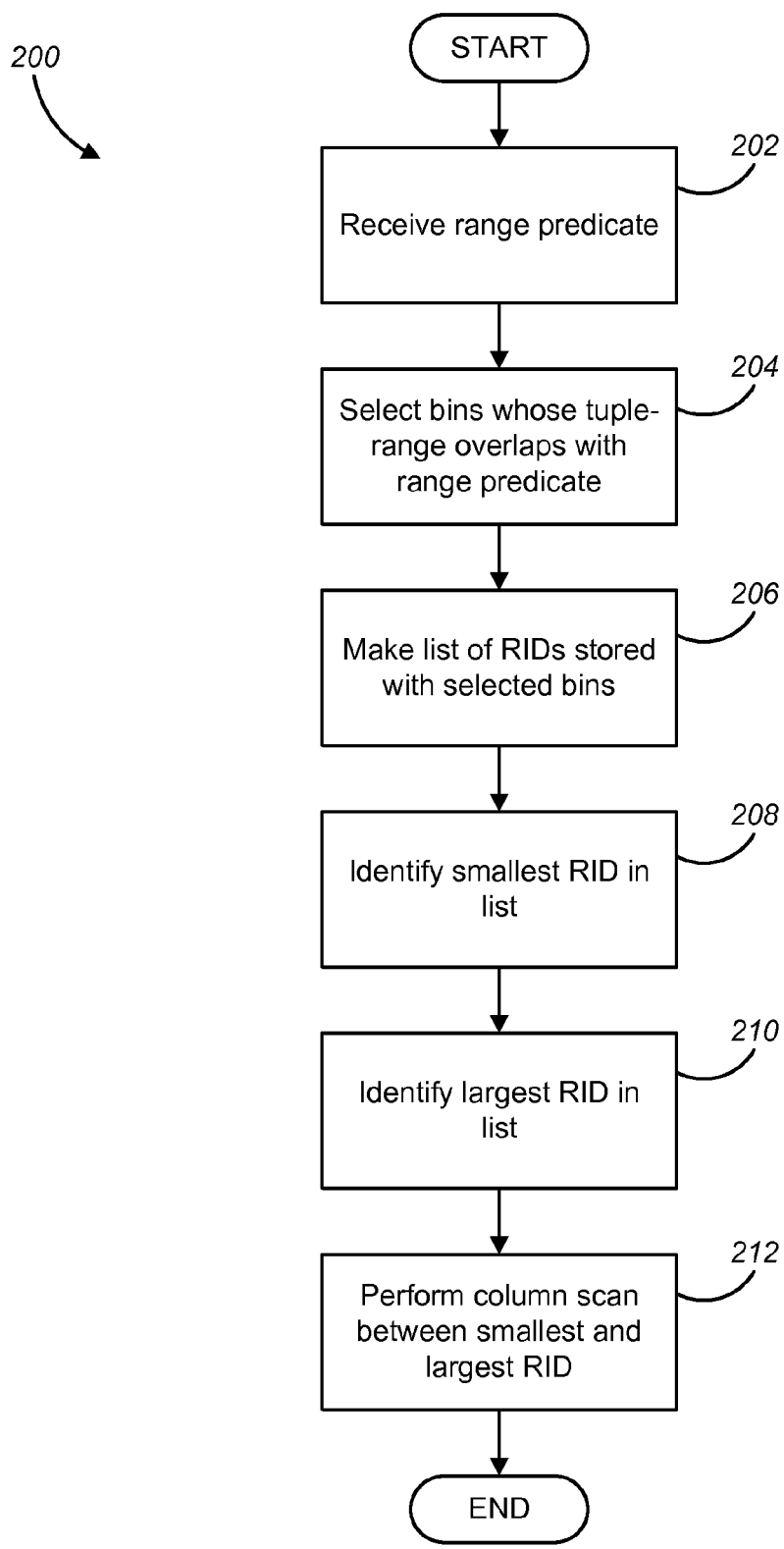
FIG. 2 is a flowchart illustrating a process for how the APINDEX is used in resolving a range predicate, in accordance with one embodiment.

FIG. 2 is a flowchart illustrating a process (200) for how the APINDEX is used in resolving a range predicate in accordance with one embodiment. As can be seen in FIG. 2, the process (200) starts by receiving a range predicate (step 202). Next, all bins whose tuple-value-range overlaps with the value-range of the incoming range predicate are selected (step 204). As discussed above, all such bins will be consecutive. After selecting the bins, a list is made of all the tuple-identifiers (RIDs) stored with the selected bins (step 206). Next, the smallest tuple-identifier from above list is identified (step 208). Next, the largest tuple-identifier from above list is identified (step 210). Finally, when a full table scan would be performed during conventional query processing, a column/table scan will instead be performed between the smallest and largest tuple identifiers from the list (step 212).

Evaluating an Equality Predicate Using the APINDEX

Figure 3:
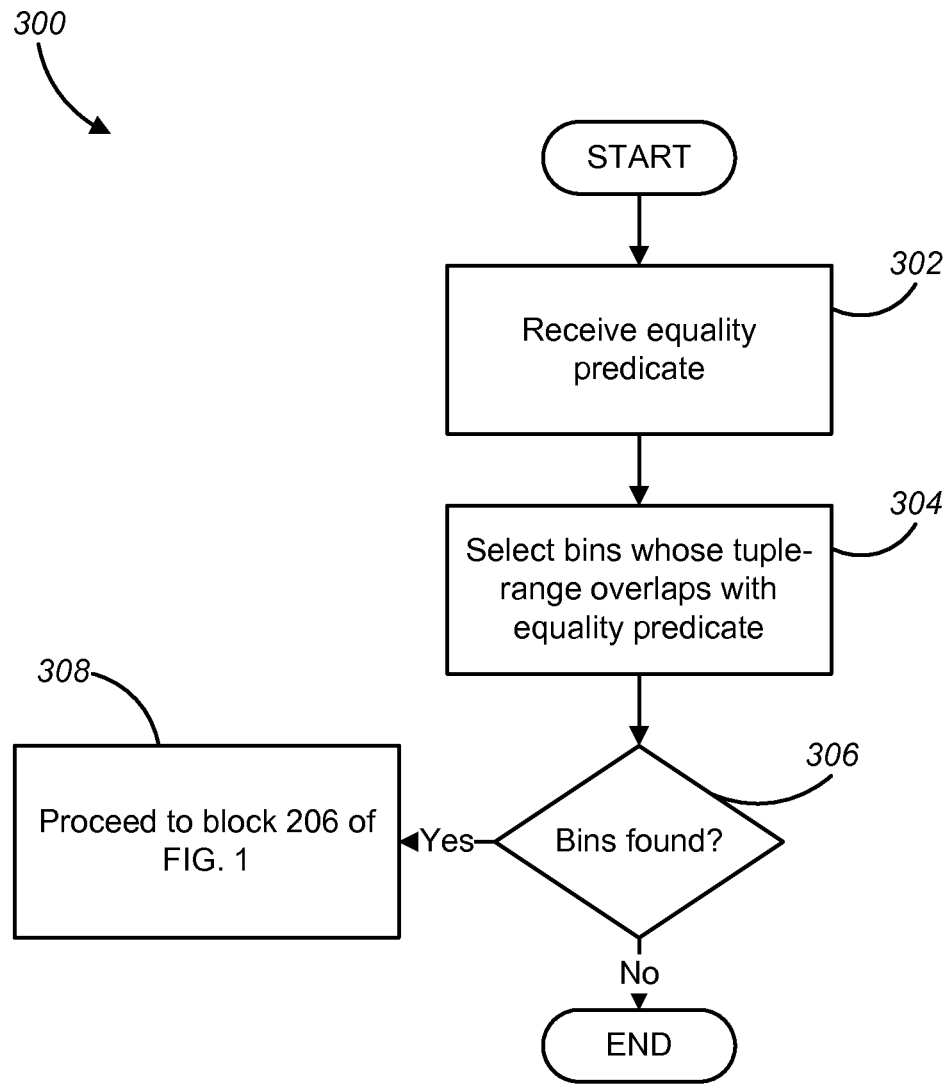
FIG. 3 is a flowchart illustrating a process for how the APINDEX is used in evaluating an equality predicate, in accordance with one embodiment.

FIG. 3 is a flowchart illustrating a process (300) for how the APINDEX is used in evaluating an equality predicate in accordance with one embodiment, that is, finding all tuples from a table that has a value equal to a given value. As can be seen in FIG. 3, the process (300) starts by receiving an equality predicate (step 302). Next, all bins whose tuple-value-range overlaps with the value-range of the incoming equality predicate are selected (step 304). The process then determines whether such bins have been found (step 306). If no bins have been found, this means that the equality predicate evaluates to false, that is, no further table scan is required, and the process (300) ends. On the other hand, if it is determined in step 306 that a single or multiple consecutive bins have been found, the process continues with step 206 of the range predicate method as discussed above with respect to FIG. 1.

Thus, by the processes (200, 300) described with respect to FIGS. 2 and 3, a full table scan can avoided for evaluating equality and range predicates, through the use of the APINDEX. In a similar manner the APINDEX also allows evaluation of LIKE, IN, Exists and other predicates used for evaluating filters and join expressions.

The methods presented above for evaluating a range, equality or other comparison predicates using the APINDEX are thus simpler, but may turn out to be inefficient in scenarios where RID ranges of a few bins selected in steps 204 and 304, respectively, are placed far apart in the column store. In such a scenario, steps 206 to 208 can be performed separately for each set of bins that overlap with each other. Further, steps 206 and 208 can be repeated for each individual disjoint bin that has not been scanned yet. After completion of all column scans, the results of each scan can be merged.

Access Cost for Finding Tuple Value Present in a Single Bin of an APINDEX

The access cost for finding a tuple value that is present in a single bin of APINDEX can be calculated as follows. In the following calculations, the variable X represents the number of bins in the APINDEX. The variable Y represents the maximum difference between the maximum and minimum RIDs for each bin.

The tuple value is searched for in the X number of bins using a binary search to select the bin. Next, a linear search is performed on the column (that is, a partial table-scan) between the min_RID and max_RID, that is, Y, of the selected bin. Searching for a tuple value in the X number of bins is of logarithmic order (O (log (X)). Performing a linear scan is of order O(Y). Thus, total the total CPU cost for these operations is: O (log (X)+Y).

Creating an APINDEX

The APINDEX may be created in various ways based on user provided inputs. The APINDEX may be created from an underlying table in which the tuple data already exists. In one embodiment, a user can limit how many bins the data structure has, while in another embodiment, the user can limit the range of values contained in each bin, without limiting the number of bins. In yet another embodiment, the user can choose to provide only an upper limit on the difference between the maximum and minimum 'unique tuple identifiers' for each bin.

This section describes how to create an APINDEX in accordance with one embodiment, where user has defined an upper bound, i.e., limit, to the number of bins, with reference to FIG. 4. FIG. 4 shows pseudo-code for creating an APINDEX. The pseudo-code uses the following variables:

Y: the maximum difference between the max_RID and min_RID for each bin. Y is a final value and it will be described in further detail below with reference to FIG. 5 how the Y value is obtained.

X: a user-provided number indicating the maximum number of bins.

BIN: a class having four variables; maxValue, minValue, maxRID, minRID ridArray: an array of a class with 2 variables; Value and RID, as shown in table 400 of FIG. 4.

Given Y, the APINDEX can be created in linear order with a single table scan. However, it may also be necessary to consider the cost of finding the correct value of Y for given X (maximum number of bins by user), as will now be described with respect to FIG. 5.

Finding the correct value of Y for a given X

This section describes how to find the correct value for Y (the difference between the max_RID and min_RID for each bin) for a given X (a user provided value representing the maximum number of bins), in accordance with one embodiment and with reference to FIG. 5. FIG. 5 shows pseudo-code for finding the correct value for Y. The pseudo-code uses the same variables that were described above with reference to FIG. 4. In addition, another variable YList is used, which represents a list of best possible values of Y in ascending order. The variable YList contains all frequently occurring values of Y (that is, the difference between max_RID and min_RID) on the given column storage. These values stand a better chance to provide a minimum number of bins for the algorithm shown in FIG. 4. As can be seen in table 500 of FIG. 5, the best possible values of Y in ascending order would be {5, 14}.

This algorithm is technically of quadratic order, but it should be noted that not all possible values of Y (say, all whole numbers) are evaluated. Only a select list of best possible values of Y is evaluated by the algorithm of FIG. 4 to get a minimum value of X for the number of bins.

An alternative approach to finding the correct value for Y for a given X is as follows. As can be seen, there is a definite relation between X and Y. For example, referring to FIG. 1, Y will be equal to N if X is 1 (i.e., the APINDEX contains only a single bin), and vice-versa, where N is total number of tuples in table. Thus, in a best-case scenario, N=X*Y may hold true, but that is not always the case. In a worst case scenario, for example, for each bin, Y=N. On any given column, a relation between X and Y can be established using sampling techniques that is, finding Y for a select sample of bins or individual values. Any relations discovered during the sampling will directly provide value of Y for a given value of X.

APINDEX Creation Example

An example will now be shown with reference to Tables 1 through 4, shown in FIG. 7, for how to create an APINDEX in accordance with one embodiment. Table 1 of FIG. 7 shows a set of RID and Value tuples in column storage (106). The RID range is from 1 through 20. It is further assumed for this example that the user has specified a maximum number of bins, X, of the APINDEX to be equal to 10.

First, all the pairs of RID and corresponding tuple value are collected by performing a full table scan. The collected pairs of tuple value and RID are then sorted based on the values. The result is shown in Table 2 of FIG. 7.

The difference between the values of two consecutive RID provides a list of best possible values for Y, in this case 5 and 14, as shown in Table 3 of FIG. 7. Using the algorithm shown in FIG. 5 provides the correct value of Y=5.

Next, the values of Y=5 and X=10 are used in the algorithm illustrated in FIG. 4, which produces the APINDEX (X=10, Y=5), as shown in Table 4 of FIG. 7.

A cost analysis of the above process shows that the full table scan is of linear order, the APINDEX creation is linear, while the determination of best possible values of Y is of quadratic order. Thus, the total cost of the APINDEX creation is effectively of quadratic order (O (N*N), where N is the total number of tuples in the table.

Updating an APINDEX

As mentioned earlier, the APINDEX can be used advantageously for Read-Optimized OLAP applications. Any insertion or updating may cause one or more bins of the APINDEX to be rendered useless in a worst case scenario by expanding the difference of max_RID and min_RID from a limited realm to full column storage. This could also cause addition of newer bins, which may not be desired. Deletion may not cause any such side effects but the APINDEX, without recreation, may not save any space by dynamically deleting the bin or adding to its performance by shortening RID range of its bins.

Insertion, deletion and updating of tuple values can still be handled by the APINDEX up to a predefined limit, as will now be discussed. But after multiple updates to the column storage, the APINDEX which was created based on an older snapshot of the column storage, needs to be recreated to provide better performance and use of space. The APINDEX can be recreated, for example, based on a user provided time based limit, or based on an update related limit, etc. The APINDEX can also be recreated if the user experiences a degradation in performance after updates are made to the column storage.

Figure 6:
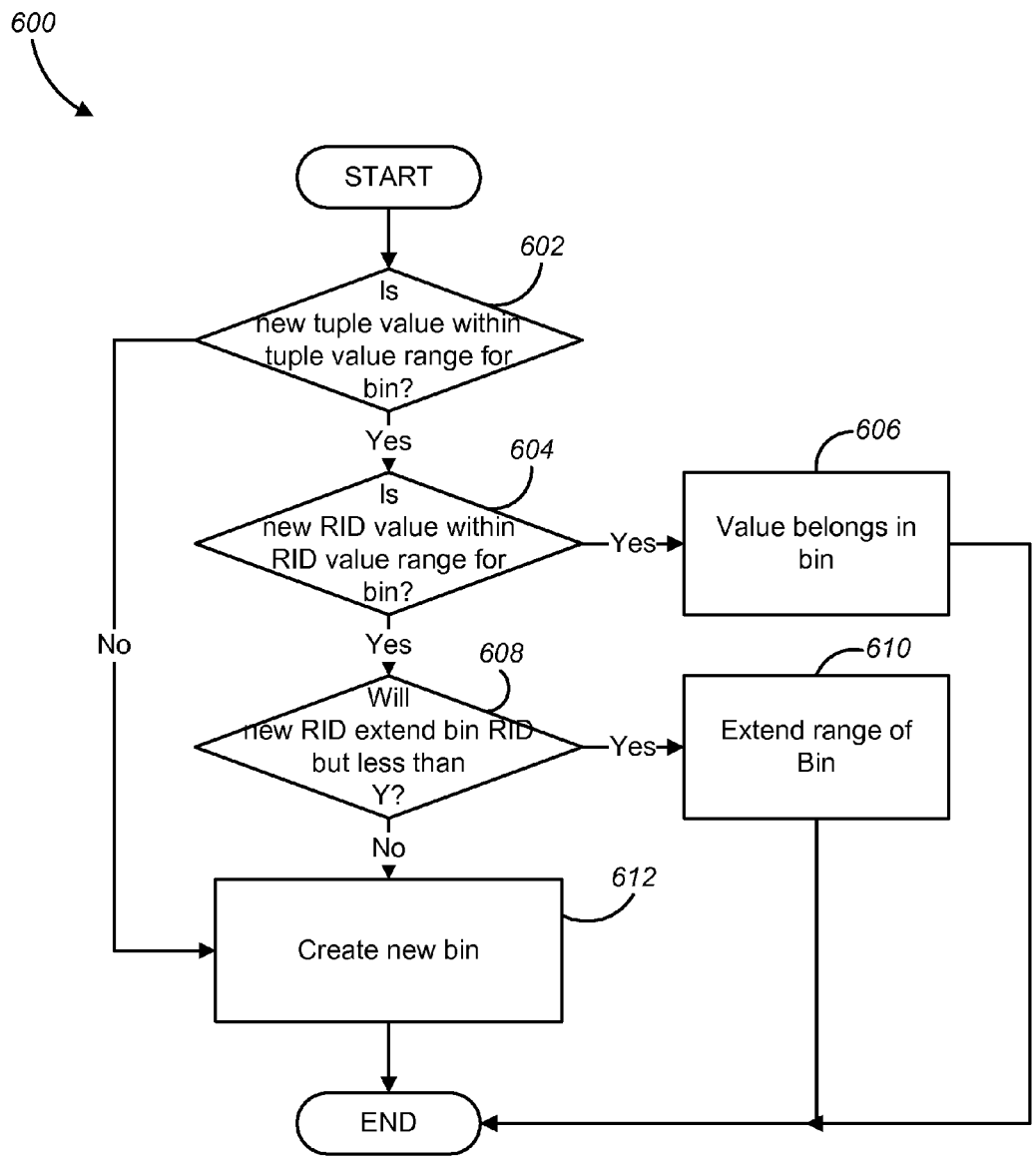
FIG. 6 shows a schematic flowchart of a process for inserting tuple values into the APINDEX, in accordance with one embodiment.

FIG. 6 shows a schematic flowchart of a process (600) for inserting tuple values into the APINDEX in accordance with one embodiment. As can be seen in FIG. 6, the process (600) starts with determining whether the new tuple value falls in the tuple value range of a given bin (step 602). If it does not, a new bin is created (step 612) and the process (600) ends. If the tuple value does fall within the tuple value range of the given bin, then it is determined whether the RID of new value falls in the RID range of the bin (step 604). If it does, then the value belongs to the bin (step 606) and the process (600) ends.

If it is determined in step 604 that the RID value is outside the value range of the bin, then the process checks whether the new RID will extend the RID range of the bin but keep it less than Y (step 608). If it does, then the RID range of the bin is extended (step 610) and the process ends. Otherwise, a new bin is created (step 612) and the process (600) ends.

When deleting tuple values, nothing needs to be done. Updates are handled in an analogous way to the insertions described above with respect to FIG. 6.

Once number of updates/insert/delete exceeds a predefined limit provided by user, the APINDEX should be recreated, as was discussed above.

Cost Optimizer Changes

Before execution of a predicate, a cost optimizer calculates both the table scan cost and any alternative index scan cost, if an index exists. The output from the cost optimizer is a finalized query execution plan. When a table scan is necessary, the cost of a full table scan is always calculated.

With the APINDEX in accordance with the various embodiments described herein, a more accurate cost can be predicted, and as a result, a better selection of a correct execution path can be provided. This is due to that the table scan cost can now be calculated using identifier information kept in a few bins only (that is, bins having tuple value range overlapping with predicate value range), instead of having to default to the cost of a full table scan.

Experimental Results

The APINDEX has been simulated on several various sources of data (real life data, randomly generated data and data having a Zipfian distribution) and the results are presented in Table 5 of FIG. 8. As can be seen, the average savings compared to conventional full table scans lie in the range of 20-60%. With the size of data being handled in conventional databases today, even a cost saving of 20% will result in major performance gains.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

The APINDEX data structure described herein can be used, for example, for read-optimized OLAP applications. The APINDEX may be described in very general terms as a variation of a Sparse Index on an unsorted column.

Many modifications and variations will be apparent to those of ordinary skill in the art without departing from the scope and spirit of the invention. For example, alternative embodiments could have less metadata in each bin, such as only one of the minimum and maximum tuple values, if the range of values in each bin is kept constant. Similarly, other embodiments may only maintain either a minimum or a maximum 'unique tuple identifier' in each bin if the range of tuple identifiers for each bin is kept constant. However, in both these cases the APINDEX will have to separately store the constant values defining the value range for the individual bins and the tuple identifier range for the individual bins, respectively.

APINDEX creation in one or more embodiments where the user has provided only an upper limit on the difference between the maximum and minimum 'unique tuple identifiers' (Y) for each bin is very similar to what is described herein above, but eliminates the need for the step illustrated in FIG. 5. APINDEX creation in one or more embodiments where a user has only provided an upper boundary on a range of values contained in each bin, i.e., without regard to the number of bins (X), is also substantially like what is described herein above. In this case, after sorting of Value-RID pairs, as shown in Table 2, values can be grouped into different bins based on the user provided limit on the range of values. Though, this grouping was also possible on unsorted dataset of Value-RID pairs.

The embodiments described herein were chosen and described in order to best explain the principles of the invention and the practical application, and to enable others of ordinary skill in the art to understand the invention for various further embodiments with various modifications as are suited to the particular use contemplated.

The invention claimed is:

1. A computer-implemented method for creating an approximate index for a database, the method comprising:
   providing a database table, the database table including a plurality of column tuples;
   selecting a column in the database table;
   partitioning the column tuples of the selected column into a plurality of bins, wherein each bin includes a range of tuples and associated metadata, the associated metadata including: a minimum tuple value for the tuples in the bin, a maximum tuple value for the tuples in the bin, a minimum tuple identifier for the bin and a maximum tuple identifier for the bin; and
   sorting the bins based on tuple values to generate an approximate index for the database, the approximate index providing a query optimizer for the database with information regarding what subset of tables need to be scanned, to allow accurate cost estimation and query planning by the query optimizer.

2. The method of claim 1, wherein the database is a relational database management system.

3. The method of claim 1, further comprising:
   receiving a user input defining a number of bins for the approximate index.

4. The method of claim 1, wherein the column is an unsorted column.

5. The method of claim 1, further comprising:
   receiving a query predicate, the query predicate including one or more values;
   selecting one or more bins whose tuple values overlap with the one or more values in the received query predicate;
   creating a list of the tuple identifiers of the selected one or more bins;
   identifying the smallest tuple identifier in the list;
   identifying the largest tuple identifier in the list; and
   performing a column scan for the query predicate between the identified smallest tuple identifier and the identifier largest tuple identifier.

6. The method of claim 5, wherein the query predicate is one of: an equality predicate, a range predicate and a comparison predicate.

7. The method of claim 1, further comprising:
   using the approximate index by a query optimizer to calculate a cost estimation.

8. The method of claim 1, wherein the bins in the approximate index are sorted based on tuple values from the bin with the smallest tuple values to the bin with the largest tuple values.

9. A computer program product for creating an approximate index for a database, the computer program product comprising:
   a non-transitory computer readable storage medium having computer readable program code embodied therewith, the computer readable program code comprising:
   computer readable program code configured to provide a database table, the database table including a plurality of column tuples;
   computer readable program code configured to select a column in the database table;
   computer readable program code configured to partition the column tuples of the selected column into a plurality of bins, wherein each bin includes a range of tuples and associated metadata, the associated metadata including: a minimum tuple value for the tuples in the bin, a maximum tuple value for the tuples in the bin, a minimum tuple identifier for the bin and a maximum tuple identifier for the bin; and
   computer readable program code configured to sort the bins based on tuple values to generate an approximate index for the database, the approximate index providing a query optimizer for the database with information regarding what subset of tables need to be scanned, to allow accurate cost estimation and query planning by the query optimizer.

10. The computer program product of claim 9, wherein the database is a relational database management system.

11. The computer program product of claim 9, further comprising:
    computer readable program code configured to receive a user input defining the number of bins in the approximate index.

12. The computer program product of claim 9, wherein the column is an unsorted column.

13. The computer program product of claim 9, further comprising:
    computer readable program code configured to receive a query predicate, the query predicate including one or more values;
    computer readable program code configured to select one or more bins whose tuple values overlap with the one or more values in the received query predicate;
    computer readable program code configured to create a list of the tuple identifiers of the selected one or more bins;
    computer readable program code configured to identify the smallest tuple identifier in the list;
    computer readable program code configured to identify the largest tuple identifier in the list; and
    computer readable program code configured to perform a column scan for the query predicate between the identified smallest tuple identifier and the identifier largest tuple identifier.

14. The computer program product of claim 13, wherein the query predicate is one of: an equality predicate, a range predicate and a comparison predicate.

15. The computer program product of claim 9, further comprising:
    computer readable program code configured to use the approximate index by a query optimizer to calculate a cost estimation.

16. The computer program product of claim 9, wherein the bins in the approximate index are sorted based on tuple values from the bin with the smallest tuple values to the bin with the largest tuple values.

17. A system for creating an approximate index for a database, comprising:
    a database, the database including a database table having a plurality of column tuples;
    a processor; and
    a memory, the memory storing instructions that when executed by the processor cause the processor to:
    select a column in the database table;
    partition the column tuples of the selected column into a plurality of bins, wherein each bin includes a range of tuples and associated metadata, the associated metadata including: a minimum tuple value for the tuples in the bin, a maximum tuple value for the tuples in the bin, a minimum tuple identifier for the bin and a maximum tuple identifier for the bin; and
    sort the bins based on tuple values to generate an approximate index for the database, the approximate index providing a query optimizer for the database with information regarding what subset of tables need to be scanned, to allow accurate cost estimation and query planning by the query optimizer.

* * * * *